United States Patent
Kohn et al.

(10) Patent No.: US 9,067,346 B2
(45) Date of Patent: Jun. 30, 2015

(54) SEAL AND PROCEDURE FOR ITS PRODUCTION

(71) Applicant: Carl Freudenberg KG, Weinheim (DE)

(72) Inventors: Jason Kohn, Hirschberg-Leutershausen (DE); Jens Trabert, Weinheim (DE)

(73) Assignee: Carl Freudenberg KG, Weinheim (DE)

( * ) Notice: Subject to any disclaimer, the term of this patent is extended or adjusted under 35 U.S.C. 154(b) by 318 days.

(21) Appl. No.: 13/658,466

(22) Filed: Oct. 23, 2012

(65) Prior Publication Data

US 2013/0043619 A1 Feb. 21, 2013

Related U.S. Application Data

(62) Division of application No. 12/963,391, filed on Dec. 8, 2010, now abandoned.

(30) Foreign Application Priority Data

Sep. 17, 2010 (DE) .......................... 10 2010 045 672

(51) Int. Cl.
*B29C 43/18* (2006.01)
*B29C 45/00* (2006.01)
*B29C 45/14* (2006.01)
*B29L 31/26* (2006.01)

(52) U.S. Cl.
CPC .......... *B29C 45/0055* (2013.01); *B29C 45/1418* (2013.01); *B29L 2031/265* (2013.01)

(58) Field of Classification Search
CPC ............ B29C 45/1418; B29C 45/0055; B29C 45/14213
USPC .......................................... 277/650; 264/266
See application file for complete search history.

(56) References Cited

U.S. PATENT DOCUMENTS

| | | | |
|---|---|---|---|
| 2,844,392 A | 7/1958 | Stonich | |
| 3,325,892 A | 6/1967 | Delgodo | |
| 3,848,880 A | 11/1974 | Tanner | |
| 4,076,262 A | 2/1978 | Deventer | |
| 4,171,561 A | 10/1979 | Bainard et al. | |
| 4,239,243 A | 12/1980 | Bainard et al. | |
| 4,258,927 A | 3/1981 | Cather, Jr. | |
| 4,289,318 A | 9/1981 | Cather, Jr. et al. | |
| 4,289,321 A | 9/1981 | Cather, Jr. | |
| 4,311,316 A | 1/1982 | Cather, Jr. | |
| 4,504,067 A | 3/1985 | Cather, Jr. | |
| 4,557,609 A | 12/1985 | More/n | |
| 4,618,154 A | 10/1986 | Freudenthal | |
| RE33,029 E | 8/1989 | Bainard et al. | |
| 5,013,052 A | 5/1991 | Butler et al. | |
| 5,297,805 A | 3/1994 | Merkin et al. | |
| 5,484,566 A * | 1/1996 | Gabbard | 264/250 |
| 5,577,741 A | 11/1996 | Sink | |

(Continued)

FOREIGN PATENT DOCUMENTS

DE 202008011032 U1 10/2008
WO 81/03044 A1 10/1981

*Primary Examiner* — Galen Hauth

(74) *Attorney, Agent, or Firm* — Harness, Dickey & Pierce, P.L.C.

(57) ABSTRACT

A seal comprising a sealing ring (1) and a slide ring (2) wherein the slide ring (2) is provided on the side of the sealing ring (1) that faces the surface to be sealed. The sealing ring (1) and the slide ring (2) are designed in one piece by molding the sealing ring (1) to the slide ring (2) in a mold cavity that forms the slide ring into a cylindrical shape.

2 Claims, 3 Drawing Sheets

(56) References Cited

U.S. PATENT DOCUMENTS

Figure 3A:
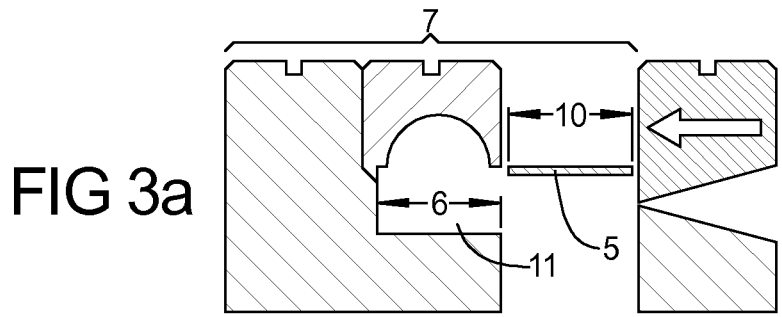

| | | |
|---|---|---|
| 5,842,700 A | 12/1998 | Fang et al. |
| 6,536,542 B1 | 3/2003 | Fang et al. |
| 6,598,690 B2 | 7/2003 | Peterson |
| 6,620,361 B1 | 9/2003 | Longtin et al. |
| 6,755,422 B2 | 6/2004 | Potter |
| 7,055,824 B2 | 6/2006 | Kobayashi et al. |
| 7,419,165 B2 | 9/2008 | Toth et al. |
| 7,464,942 B2 | 12/2008 | Madigan |
| 7,497,443 B1 | 3/2009 | Steinetz et al. |
| 7,565,913 B2 | 7/2009 | Pozzati |
| 7,866,669 B2 | 1/2011 | Kobayashi et al. |
| 8,020,638 B2 | 9/2011 | Chellappa et al. |
| 8,075,000 B2 | 12/2011 | James et al. |
| 8,146,924 B2 | 4/2012 | Ohmi et al. |
| 2006/0022412 A1 | 2/2006 | Brock et al. |
| 2008/0157486 A1* | 7/2008 | Kuzawa et al. ............... 277/650 |

\* cited by examiner

FIG 1
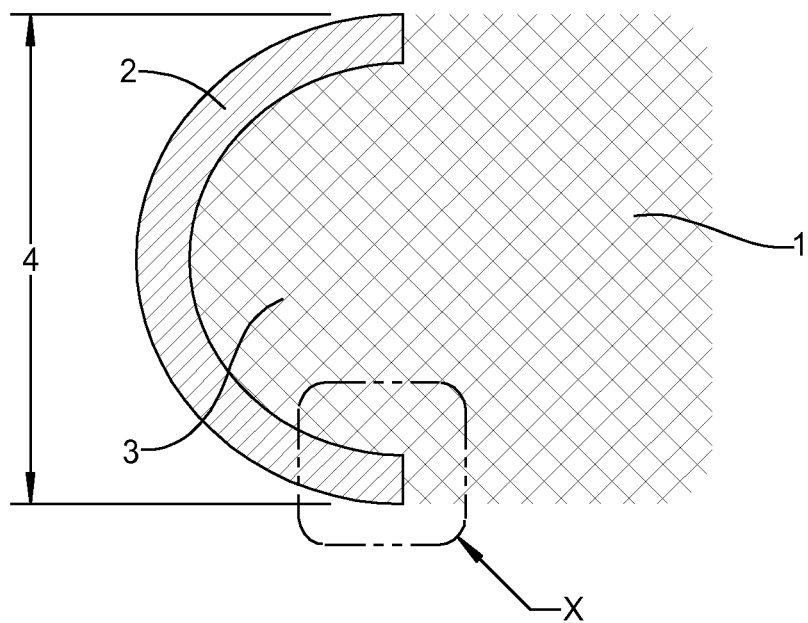
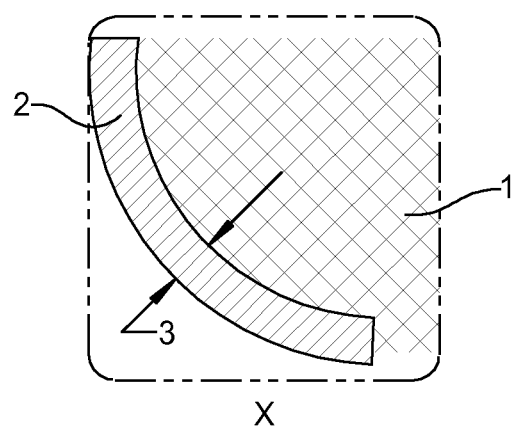
FIG 2

SEAL AND PROCEDURE FOR ITS PRODUCTION

CROSS-REFERENCE TO RELATED APPLICATIONS

This application is a divisional of U.S. patent application Ser. No. 12/963,391, filed Dec. 8, 2010 (now abandoned), which claims the benefit and priority of German Application No. 10-2010 045 672.1-12, filed Sep. 17, 2010. The entire disclosures of the above applications are incorporated herein by reference.

FIELD

The present disclosure relates to a seal comprising a sealing ring and a slide ring wherein the slide ring is provided on the side of the sealing ring that faces the surface to be sealed.

BACKGROUND

This section provides background information related to the present disclosure which is not necessarily prior art.

Such seals are generally known and are two-piece designs. The sealing ring may, for example, consist of an elastomeric material and be an O-ring. The slide ring however is made of a polymeric material such as PTFE, and the slide ring tightly encompasses and seals the surface to be sealed of the machine element to be sealed. The installation groove in the housing where the seal is located is sealed by the sealing ring. The sealing ring is preloaded and placed in a tightly sealing manner between the bottom of the installation groove and the slide ring. The disadvantage of such a previously known seal is that its production is complex and expensive. The installation of such a seal is also comparatively complicated because the housing in which the installation groove is located has to be of multi-part design for the seal to be installed. The housing has to consist of multiple parts because the slide ring of the previously known seal is not too elastic and cannot be sufficiently and resiliently deformed during the installation of the seal.

SUMMARY

This section provides a general summary of the disclosure, and is not a comprehensive disclosure of its full scope or all of its features.

The problem to be addressed by this invention is to further develop a seal of the previously known type so that it can be produced easily and cost-efficiently and is sufficiently elastic to be installed in one-piece installation grooves of machine elements.

This problem is solved according to the invention by a seal including a sealing ring and a slide ring wherein the slide ring is provided on the side of the sealing ring that faces the surface to be sealed, characterized in that the sealing ring and the slide ring are formed in one piece.

A seal is provided for solving the problem characterized in that the sealing ring is integral with the slide ring.

The production and installation of the seal are already simplified by the one-piece design of the sealing ring and slide ring. The risk of installation errors when installing the seal in the installation space is minimized due to the integral design.

The sealing ring may consist of an elastomeric material. Such materials for sealing rings are known, inexpensive, and available with different specifications for many applications.

The slide ring may consist of a polymeric material and have a friction coefficient that is smaller than the friction coefficient of the elastomeric sealing ring. Polymeric materials that can be used for the slide ring are, for example, PTFE or PEEK materials. These materials have a clearly lower friction coefficient than the elastomer the sealing ring is made of. Slide rings made from these materials have invariably good functional properties over a long period of service. This is an advantage to be emphasized with regard to a long seal life.

The slide ring may have a film-like design and preferably have a thickness in the range from 0.1 to 1.0 mm. The low thickness of the slide ring makes the seal particularly resilient, especially in radial direction, and it can be inserted into one-piece installation spaces of machine elements despite the slide ring, just like seals that exclusively consist of elastomeric materials like conventional O-rings.

In a preferred embodiment, the slide ring may cover the entire axial width of the sealing ring. The large contact area between the sealing ring and the slide ring provides for excellent adhesion of the two parts to each other. The slide ring virtually forms a shell around the side of the sealing ring that faces the surface to be sealed. In the areas where the slide ring is in sealing contact with the surface to be sealed, there are no joint lines between the sealing ring and the slide ring, and there is no risk that the sealing ring and the slide ring might separate even over a very long service life of the seal.

The slide ring sits tightly against the sealing ring across the contact surface.

For example, the slide ring may be substantially semicircular and have a radial bulge towards the surface to be sealed. The seal will then have the form of a so-called D-ring wherein the entire semicircular outward bulge is formed by the film-like slide ring. Other geometries are also conceivable.

The slide ring and the sealing ring are preferably joined by an integral joint. Such an integral joint will last even through a long service life.

Using the seal according to the invention, the frictional force is only half the size as compared to seals that do not have a slide ring, such as conventional O-ring seals, under the same boundary conditions; in addition to easy installation and almost as simple production, undesired stick-slip effects are reliably prevented.

The invention also relates to a procedure for producing a seal as described above.

The procedure for producing the seal involves a first step in which a cylindrical tube section of the polymeric material of the slide ring is placed in the tool cavity of a manufacturing tool and held in its position, the tube section dividing the tool cavity in radial direction into a slide ring cavity and a sealing ring cavity that are radially adjacent, and the tube section comprising an axial width that substantially corresponds to the axial width of the tool cavity, and a second step in which elastomeric material is pressed into the sealing ring cavity in such a way that the elastomeric material completely fills the sealing ring cavity and molds the tube section radially into the slide ring cavity until the tube section comes to rest against the wall that delimits the slide ring cavity, and yet another step in which the seal is removed from the manufacturing tool. This procedure is simple and inexpensive. Its advantage substantially is that the elastomeric material of which the sealing ring is made is pressed into the sealing ring cavity and automatically molds the tube section radially into the slide ring cavity when it completely fills the sealing ring cavity. When the tube section comes to rest against the wall that delimits the slide ring cavity, the sealing ring cavity and the slide ring cavity are mostly filled with the elastomeric material of the sealing ring while the slide ring and the sealing ring are joined at their contact surfaces during the production process.

After removal from the manufacturing tool, a seal is obtained in which the sealing ring and the film-like slide ring are integral and that is sufficiently elastic to install the seal in one-piece installation spaces of machine elements.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

An embodiment of the seal according to the invention will be described in more detail with reference to FIGS. 1 and 2 below.

The procedure for producing the seal is depicted in FIGS. 3*a*-3*j*.

Corresponding reference numerals indicate corresponding parts throughout the several views of the drawings.

DETAILED DESCRIPTION

Example embodiments will now be described more fully with reference to the accompanying drawings.

FIG. 1 is a cross-sectional view of the seal of the invention. The seal includes a sealing ring 1 and a slide ring 2 that are designed as one piece. The slide ring 2 can be provided radially inside or radially outside the sealing ring 1, the sealing ring 1 and the slide ring 2 being joined by an integral joint.

The procedure for producing this seal will be explained below with reference to FIG. 3.

The sealing ring 1 and the slide ring 2 consist of differing materials. The sealing ring 1 is made of an elastomeric material, the slide ring 2, in the embodiment shown here, of PTFE. The material of the slide ring 2 enables the seal to slide over the surface to be sealed without noticeable resistance. The surface to be sealed may be a rod that can be moved translationally back and forth and is arranged in a cylinder. The installation space would in such a case be formed by an installation groove in the cylinder that is open in radial direction towards the rod to be sealed.

The slide ring 2 not only comprises a low friction coefficient but is also as thin as a film. It is important that the seal can be elastically deformed, especially in radial direction, so that it can be installed in one-piece installation grooves. This is facilitated by the film-like thin slide ring that is virtually as elastic as the sealing ring. To ensure such elasticity of the seal, the slide ring 2 in the embodiment shown here has a thickness 3 of 0.2 mm.

The slide ring 2 stretches across the entire axial width 4 of the sealing ring and is semicircular with a radial bulge towards the surface to be sealed.

FIG. 2 shows the enlarged section "X".

The integral joint between the sealing ring 1 and the slide ring 2 can be seen here. The sealing ring 1 and the slide ring 2 are in one piece and captively joined.

FIG. 3 shows a diagram of the procedure for producing the seal described above.

FIG. 3*a* shows a cylindrical tube section 5 that is made of PTFE in the embodiment shown here and will later form the slide ring. The tool cavity 6 of the manufacturing tool 7 is still open.

Figure 3B:
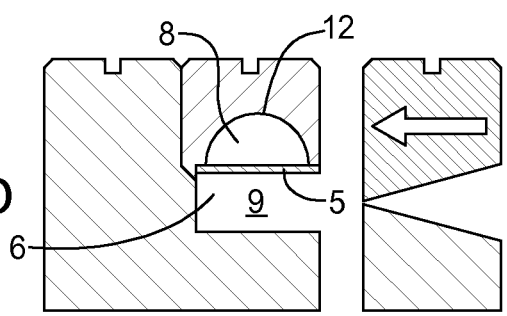

In FIG. 3*b*, the cylindrical tube section 5 has been placed into the tool cavity 6 and the tool component through which the elastomeric material will later be pressed into the tool cavity 6 is moved into the direction of the tube section 5 located in the tool cavity 6.

Figure 3C:
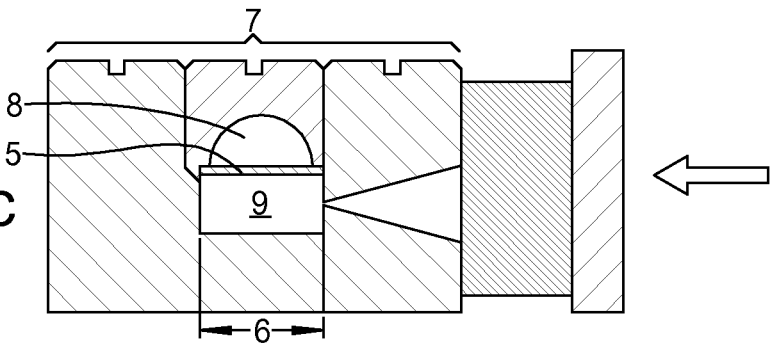

In FIG. 3*c*, the tool cavity 6 is closed and the tube section 5 is held in its position by the closed manufacturing tool 7.

As can be seen in this Figure, the tube section 5 divides the tool cavity 6 in radial direction into a slide ring cavity 8 shown above the tube section 5 here and a sealing ring cavity 9 shown below the tube section 5 here.

Figure 3D:
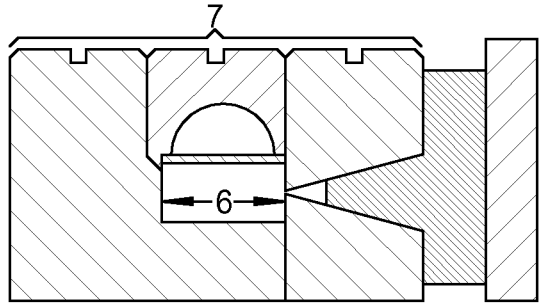

In FIG. 3*d*, the elastomeric material that is to form the sealing ring 1 is pressed through the sprue of the manufacturing tool 7 into the tool cavity 6.

Figure 3E:
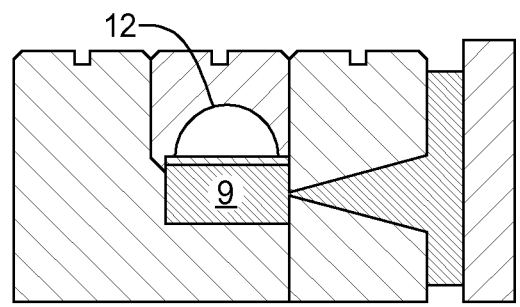

Pressing the elastomeric material of the sealing ring 1 into the sealing ring cavity 9 is continued in FIG. 3*e*, and the sealing ring cavity 9 is completely filled with elastomeric material as shown here.

Figure 3F:
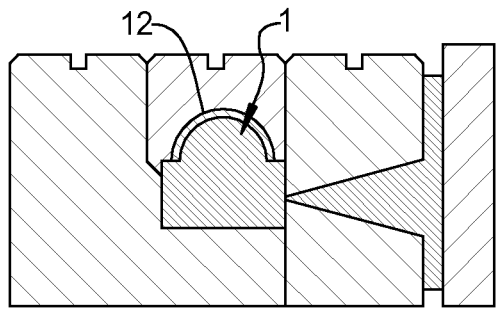

Further elastomeric material is pressed into the tool cavity 6 and now molds the previously cylindrical tube section 5 in radial direction into the slide ring cavity in FIG. 3*f*. The elastomeric material of which the sealing ring 1 is made is pressed into the tool cavity 6 until the tube section 5 comes to rest against the wall 12 of the tool cavity 6 that delimits the slide ring cavity 8.

Figure 3G:
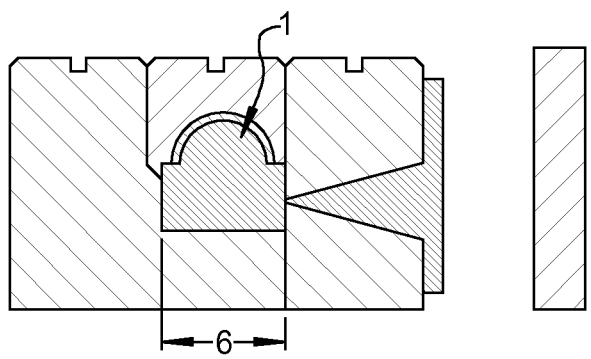

The second step of the procedure is completed in FIG. 3*g*. The pressing-in process of the elastomeric material of the sealing ring 1 into the tool cavity 6 is completed.

Figure 3H:
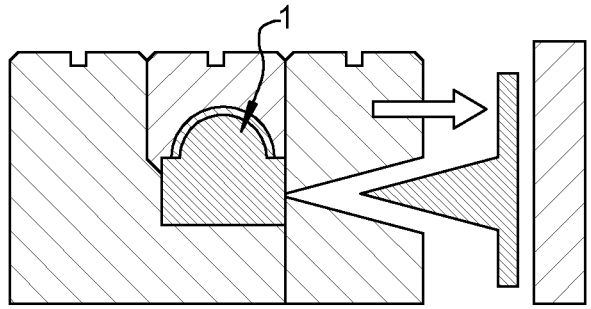
Figure 3I:
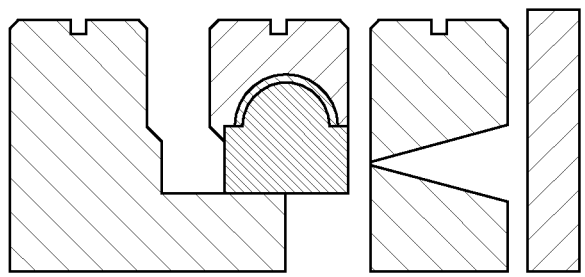
Figure 3J:
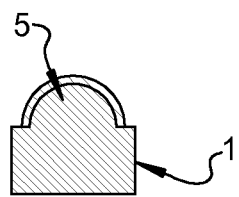

The seal consisting of the sealing ring 1 and the slide ring 2 in an integral joint is removed from the manufacturing tool 7 in FIGS. 3*h* to 3*j*.

The removed seal according to the invention is shown in FIG. 3*j*.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A procedure for producing a seal comprising:
in a first step of the procedure, a tubular-shaped section (5) of a polymeric material of a slide ring (2) is placed in an annular tool cavity (6) of a manufacturing tool (7) and held in its position, the tubular-shaped section (5) dividing the annular tool cavity (6) in a radial direction into an annular slide ring cavity (8) and an annular sealing ring cavity (9) that are radially adjacent, and the tubular-shaped section (5) defining a center opening therethrough and comprising an axial width (10) that substantially corresponds to an axial width (11) of the annular tool cavity (6), in that, in a second step of the procedure, elastomeric material is pressed into the annular sealing ring cavity (9) in such a way that the elastomeric material completely fills the annular sealing ring cavity (9) and molds the tubular-shaped section (5) radially into the annular slide ring cavity (8) until the tubular-shaped section (5) comes to rest against an annular wall (12) that delimits the annular slide ring cavity (8), and in that in another step of the procedure the seal is removed from the manufacturing tool (7).

2. The procedure to claim 1, where in the annular wall (12) that delimits the annular slide ring cavity (8) is partially cylindrical in cross-section such that the tube section (5) forms a partial cylindrical slide ring (2) of the seal.

\* \* \* \* \*